United States Patent [19]

Homes

[11] Patent Number: 5,706,721
[45] Date of Patent: Jan. 13, 1998

[54] FOOD CAN DRAINER

[76] Inventor: Hamilton E. Homes, 275 Noroton Ave., Darien, Conn. 06820

[21] Appl. No.: 625,722

[22] Filed: Mar. 29, 1996

[51] Int. Cl.⁶ .................. A47J 19/06; B30B 9/02
[52] U.S. Cl. .................. 99/495; 99/506; 100/110; 100/116; 210/464; 210/768
[58] Field of Search .................. 99/495, 506, 507, 99/508; 100/110, 116, 213, 295; 210/470, 464, 768; D7/667, 665; 215/231

[56] References Cited

U.S. PATENT DOCUMENTS

| | | | |
|---|---|---|---|
| D. 337,702 | 7/1993 | Lange | D7/665 |
| D. 361,697 | 8/1995 | McNaughton | 100/110 X |
| 1,107,989 | 8/1914 | Oestreich . | |
| 3,040,897 | 6/1962 | Holman | 210/464 X |
| 3,380,592 | 4/1968 | Arnold | 210/224 |
| 3,392,845 | 7/1968 | Shapiro et al. | 210/470 |
| 3,995,544 | 12/1976 | Farley | 100/116 |
| 4,355,574 | 10/1982 | Bond et al. | 100/234 |
| 5,148,951 | 9/1992 | Moure et al. | 222/116 |
| 5,320,031 | 6/1994 | Whitney | 99/495 |
| 5,372,063 | 12/1994 | Berg | 100/110 |

*Primary Examiner*—Reginald L. Alexander
*Attorney, Agent, or Firm*—St. Onge Steward Johnston & Reens LLC

[57] ABSTRACT

A food can drainer for a can containing a solid foodstuff and packing fluid is a foraminous sheet sized to fit an end of the can when the can is open at that end, with holes in the sheet sized to retain the foodstuff in the can, yet allow flow of the packing fluid when the can is tipped to decant the fluid. For typical cylindrical cans such as tuna or salmon, the drainer is a perforated disc sized to fit snugly in the can so that, when the can is inverted, packing fluid flows out of the holes in the disc and manual pressure can be exerted to squeeze out excess fluid. The holes are positioned so that the packing fluid forms a stream in the approximate center of the drainer. The drainer can be installed in the can during or after canning.

9 Claims, 1 Drawing Sheet

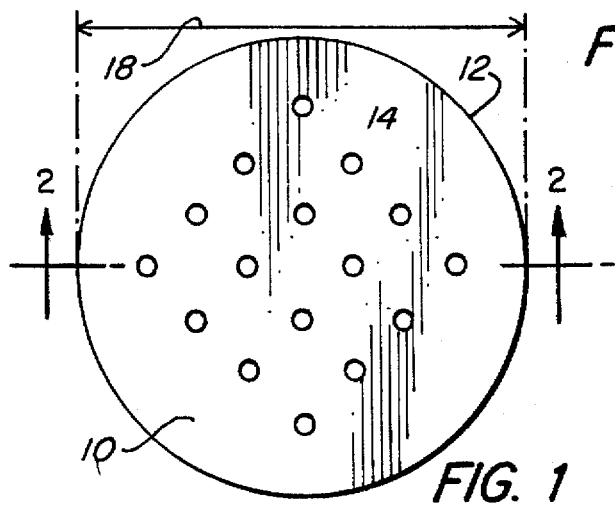
FIG. 1
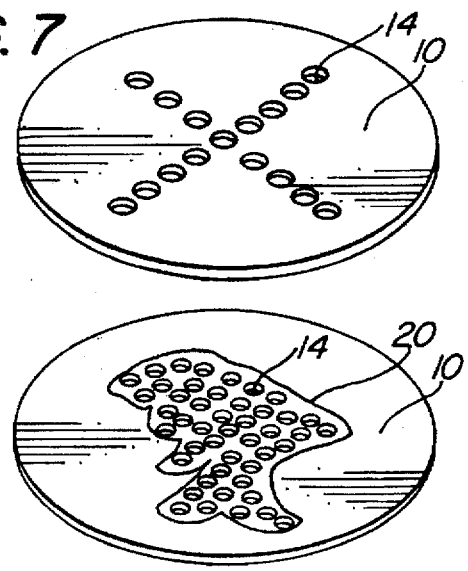
FIG. 7
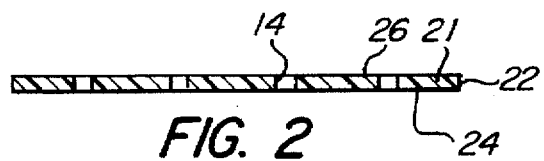
FIG. 2
FIG. 8
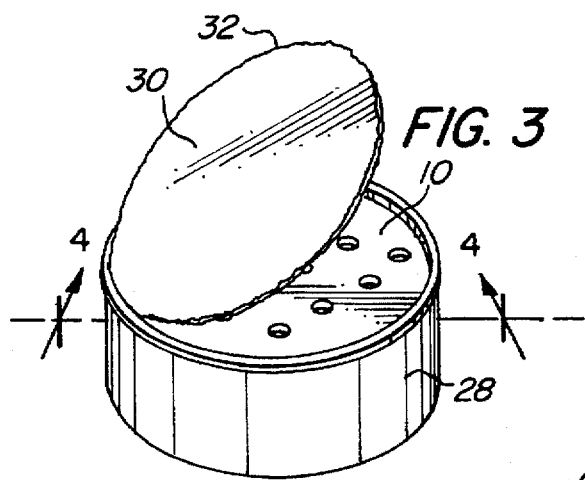
FIG. 3
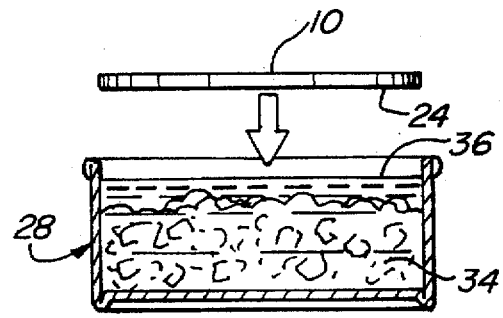
FIG. 5
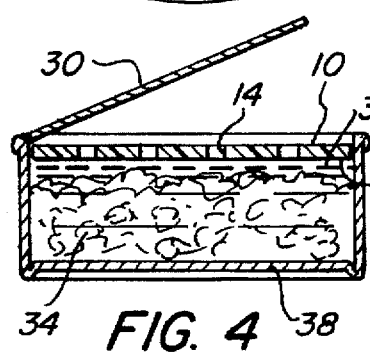
FIG. 4
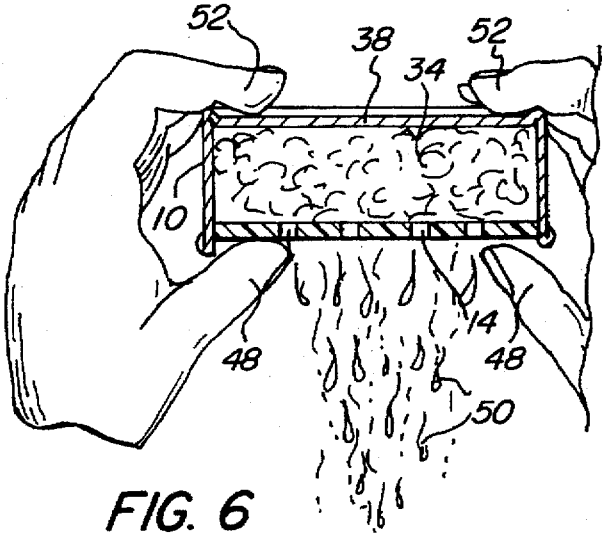
FIG. 6

FOOD CAN DRAINER

DESCRIPTION

Technical Field

This invention relates to a food can drainer and a method for draining canned foods.

Canning foods has been an important part of food preservation and manufacturing since the invention by the British of "tin cans" for preserving meat for long sea voyages in 1812. Even after the advent and widespread use of other methods of food preservation such as freezing, the production of shelf-stable canned foods such as fish remains an important part of the food industry. Canned tuna and salmon, for example, represent 90% of the total fish pack in the U.S.

In a typical process, fish, most of which have been frozen on the fishing vessel and held frozen in air until the cannery is approached, are thawed. They are eviscerated, precooked, cleaned, and the meat, sorted. Dark meat and trimmings are used for making pet food, meal and oil. The better fish fillets are cut and packed by machine as solid meat or chunks for human consumption. Filled cans pass down a line where salt and then oil or water are added, and the cans are heated, sealed, and retorted.

Similarly, canned meats are typically manufactured by heat processing to produce either pasteurized or shelf-stable products. The former must be held under refrigeration, as in the case of canned hams and picnics (pork shoulders). Shelf-stable canned meats are heated for a sufficient time to destroy most pathogens and can be cured without refrigeration. Common canned meat items include hams, luncheon meats, meat balls, Vienna sausage, and potted meat. Some of these are reacted with curing ingredients before being sealed in cans and heat-processed.

Because of differences in the food product, vegetable canning is slightly different. In vegetable canning, the vegetables are typically washed with chlorinated water to remove soil, stones, and other debris and to reduce the microbial population. Products are sorted, trimmed, peeled, and/or sliced according to specific need. Many products are then blanched, i.e., subjected to relatively mild heat treatment before packing into a container. Blanching serves as a final wash to reduce the microbial load, removing certain raw or off-flavors, and increases the pliability of the product to facilitate filling and permitting expulsion of dissolved or occluded gases from plant tissue. During blanching, the product is exposed to hot water or steam for several minutes and then immediately put into containers and packed in salt brine or syrups to cover. Filled containers are generally exhausted by being passed through a hot water bath or steam chamber to expel gas and expand the product before the can is sealed.

Unlike vegetables, which ordinarily require pressure-cooker processing up to about 250° C. to inactivate spores of *Clostridium botulinum* that may grow in foods stored at room temperature and neutral pH's, many fruits naturally possess sufficient acidity to permit thermal preservation at lower, i.e., boiling water temperature, before canning. Fruits are prepared by washing, sorting, and trimming. Specialized preparation may be required for some fruits, such as stem and pit removal for cherries and peel and core removal for apples. Sliced or prepared fruit may require blanching to remove tissue gases prior to filling. Aggregate fruit products such as whole berries or sliced portions may be canned in water or sugar syrups. Filled containers are exhausted by thermal or vacuum within the container upon cooler. Sealed containers are typically heated in water or atmospheric steam to about 200° F. in the container center prior to cooling.

Note that almost all canned food products are stored in some kind of packing fluid that is an oil, brine, syrup, fruit or vegetable juice, or the like, or mixtures of these. Removing this fluid has been the source of mess and frustration since the advent of the tin can.

BACKGROUND OF THE INVENTION

When canned food products are opened, it is common practice to partially or fully drain off the packing fluid before eating the foodstuff or using it in a recipe. Indeed, many recipes such as those calling for tuna or spinach require that the foodstuff be completely wrung out to remove as much of the packing fluid as possible.

A number of devices have been suggested for efficiently draining off, and in some cases squeezing out, packing fluid from a canned food product. Whether the can is opened with a can opener or a key, or the "can" is a glass jar with a lid, a common means of accomplishing this is to use the lid as a press. After opening the can around its edge, the can is tipped and fluid, decanted. If more fluid is to be removed, the lid is pushed down on the can contents while the can remains tipped. Because of the geometry of the can lid, however, this procedure is messy because the only way packing fluid can escape is around the lid. Packing fluid typically squirts out all round the lid, and on the hand and often down the arm of the person holding the tipped can.

Berg suggested a press with a lid-engaging portion capable of abutting a severed can lid, so that it could be more efficiently used to press liquid from canned food (U.S. Pat. No. 5,372,063). Bond and Dail disclosed a tong-like implement for the same purpose, except that the severed lid was not required as a press (U.S. Pat. No. 4,355,574). In U.S. Pat. No. 1,107,989, Oestereich described a cheese-follower comprising a plate with apertures for draining whey from cheese. Arnold suggested a flat disc with a shaft handle for lifting pickles and the like from an opened jar (U.S. Pat. No. 3,380,592). Lange disclosed an ornamental design for a tuna can press shaped like a waffle iron (Des. 337,702). The Shapiros suggested a device for removing fat, oil, grease, or other fatty liquid that was a pan-like structure with a raised central perforate portion somewhat similar to an English tea strainer (U.S. 3,392,845). Farley suggested a cup-like utensil for squeezing and straining tuna that also fit on the inside of a can (U.S. Pat. No. 3,995,544). In U.S. Pat. No. 5,320,031, Whitney disclosed a more complex drainer/storage device consisting of a container with lids, a strainer and a plunger.

Use of these devices, or a strainer or colander can usually obviate messy hands and arms, but leaves the cook with another utensil to wash. Other can presses such as the tong-like implement described above have been devised to solve the problem, but cans vary in size and so a number are required for an average kitchen. Moreover, like colanders and strainers, can presses have to be washed and stored like other kitchen paraphernalia, which is a nuisance.

It would be desirable to have a simple food can drainer that's easy to use and to store. It would also be desirable to have a food can drainer that's disposable.

DISCLOSURE OF THE INVENTION

It is an object of the invention to provide a food can drainer that is easy to use and to store, and so inexpensive that it can be disposable.

It is another object of the invention to provide a food can drainer that can be used as a can insert during or after canning.

These and other objects are achieved by the present invention, which provides a food can drainer and a method for its use. The invention comprises a food can drainer for a can containing a solid foodstuff and packing fluid, wherein the drainer comprises a foraminous sheet sized to fit an end of the can when the can is open at that end, with holes in the sheet sized to retain the foodstuff in the can, yet allow flow of the packing fluid when the can is tipped to decant the fluid. For cylindrical cans such as tuna or salmon cans, the drainer is a perforated disc that can be inserted prior to or after canning. In preferred embodiments, the sheet is fabricated to structurally withstand manual pressure exerted between the drainer and the can bottom, so that packing fluid can be squeezed out of the can. The holes in the sheet are positioned such that most of the packing fluid squeezed out of the can comes out of the holes and not around the edges of the drainer and so that a stream of liquid at the approximate center of the drainer is formed when the can is tipped to decant the fluid.

The invention correspondingly provides a method for controlling the flow of decanted fluid from a food product contained in a can having a top and a bottom and containing fluid, comprising using a foraminous, substantially planar drainer sized to fit the interior of the can top and having holes fabricated so that, when the drainer is installed or placed at the top of the can after its opening, packing fluid can be decanted therefrom when the can is tipped, the drainer being fabricated to also withstand manual pressure exerted between the top of the can and its bottom, to enhance flow of the decanted packing fluid when the drainer is pressed against the can bottom.

Other objects, aspects and features of the present invention in addition to those mentioned above will be pointed out in or will be understood from the following detailed description provided in conjunction with the accompanying drawings.

BRIEF EXPLANATION OF THE FIGURES

FIG. 1 is a drawing of a top view of a food can drainer of this invention comprising, in the illustrated embodiment, a foraminous disc having 16 spaced drain holes evenly spaced in a 4 by 4 configuration.

FIG. 2 is a cross-sectional side view of the drainer shown in FIG. 1, illustrating the four drain holes.

FIG. 3 is a front perspective view, and FIG. 4, a cross-sectional side view, of a drainer of the invention installed in the top of a food can.

FIG. 5 is a cross-sectional side view of a drainer of the invention being lowered into the top of a food can.

FIG. 6 is a cross-sectional side view of a drainer of the invention in use in an inverted food can, with the packing food juices draining away through the drain holes.

FIG. 7 is a top perspective view of an alternate drain hole arrangement in an X configuration, and FIG. 8 shows drain holes positioned to represent the shape of a fish.

BEST MODE FOR CARRYING OUT THE INVENTION

As illustrated in FIGS. 1 to 8, this invention describes a food can drainer and a method for using it.

By a food "can" is meant any of the usual aluminum, steel, tin, tin-coated and other metal, often cylindrical, receptacles used for food product storage, as well as their glass, plastic, and composite container counterparts used by food manufacturers and purveyors for storing, packing, and preserving perishable foods. This term includes cans made of sheet metal and drawn containers, with crimped seals as well as peel-off lids.

FIG. 1 shows a top view of a foraminous disc-shaped food can drainer 10 of this invention having drain holes 14. The drawing illustrates 16 holes 14 symmetrically positioned on each side of disc diameter 18 and evenly spaced in a 4 by 4 configuration, but any symmetrical or unsymmetrical arrangement of drain holes 14 are encompassed by the invention. FIG. 7, for example, illustrates an alternative arrangement of 17 drain holes 14 set out in an X-configuration (9 by 8). The holes may be spaced evenly or unevenly.

FIG. 8 illustrates a top perspective view of another embodiment of a drain hole configuration. As depicted, drain holes 14 are crowded together in the center of drainer 10 and positioned to define a fanciful shape of a fish 20. It is an advantage of the invention that the drain hole arrangement can be thus employed for promotional purposes, and can define other symbols and/or letters advertising a trademark, trade name, product name, manufacturer, seller, or the like.

As illustrated, drainer 10 is in the shape of a circle 12 that fits as a disc into the food can to be drained (hereinafter illustrated), but any other shape is encompassed by the invention, such as rectangles for sardine cans and the like (not illustrated). Drainer 10 can be plastic, metal or any other material or material mixtures known to those skilled in the art. Preferred materials are inert in the sense of unreactive with the food product, so that no off-flavors or colors are imparted to the food during the draining procedure and, in embodiments wherein the drainer is installed in the can prior to canning, during the canning procedure. Plastic is used in most embodiments because it is inexpensive, inert, and light in weight.

FIG. 2 is a cross-sectional side view of drainer 10, illustrating four drain holes 14 through thickness 21 of the drainer. It can be seen from this view together with FIG. 1 that drainer 10 has an overall disc shape, such that side edge 22 defining circumferential edge 12 is perpendicular to top surface 26 and bottom surface 24 and sized to smugly fit into the can interior. In preferred embodiments of a circular drainer, top surface 26 and bottom surface 24 are symmetrical and reversible so that either the top or bottom surface can be placed in the can and used to drain the canned food product when the can is tipped. It is an advantage of the invention that, where the drainer is inserted into a can to be drained, it doesn't matter whether the top surface or the bottom surface faces the food because the two surfaces can be used interchangeably.

FIG. 3 is a front perspective view of drainer 10 positioned in a cylindrical food can 28. The figure illustrates an embodiment wherein drainer 10 is installed in can 28 before or during canning, so that when the can is opened around circumferential edge 32 and lid 30 folded back as shown, drainer 10 is exposed. In this embodiment, lid 30 is removed and can 28 inverted for draining as shown in FIG. 6, more particularly described below.

FIG. 4 shows a cross-sectional side view of this embodiment. During the canning process, after food product 34 is placed in can 28, drainer 10 is inserted such that bottom drainer surface 24 faces can bottom 38 in a parallel configuration. So positioned, drainer 10 can rest against food product 34 contained in packing fluid 50, against fluid surface 36, and/or be held by circumferential edge 12 against correspondingly sized interior lip of the can. Can 28 is then sealed, and when it is opened as shown in FIGS. 3 or 4, lifting can lid 30 exposes drainer 10. The can is inverted as shown in FIG. 6, allowing packaging fluid 50 to drain through holes 14 and drainer 10 is then removed from the can, exposing drained food product 34.

It is an advantage of the invention that the drainers made and used according to the invention are, in most embodiments, so inexpensive, inert, and light that they can be installed in cans as illustrated in FIGS. 3 and 4. As soon as the can is opened, the drainer is exposed for quick use and then disposal.

FIG. 5 is a cross-sectional side view illustrating another embodiment of the invention. Unlike the embodiment described above wherein the drainer is canned together with the food product and its packing fluid, in this embodiment, drainer 10 of the invention is lowered into the top of food can 28 after it is opened. Surface 24 of drainer 10 comes to rest on fluid level 36 and inverted as shown in FIG. 6. Packing fluid 50 drains through drain holes 14 in the drainer.

In either embodiment, excess fluid can be squeezed out of food product 34 by applying pressure with thumbs 48 grasping the can as illustrated. Thumb pressure thrusts drainer 10 toward can 28 bottom 38, forcing more liquid 50 out of food product 34. In preferred embodiments, drainer 10 fits snugly in can 28 so that when the can is tipped for draining, packing fluid 50 comes out of holes 14 and not around the edge 12 of the drainer. The holes are positioned so that a stream of liquid is formed in the approximate center of the drainer when the can is tipped as shown in FIG. 6.

It is an advantage of the invention that the amount of fluid 50 wrung out of food product 34 depends upon the amount of pressure and so can be adjusted over a wide range to the desired amount by the user. For some food products such as canned seafood, if the user desires, most of the packing fluid can be wrung out by exerting considerable pressure, by squeezing user thumbs 48 against forefingers 52, thrusting the drainer towards the can bottom. On other hand, if a moister food product 34 is desired as in the case of fruit, application of light pressure between user thumbs 48 and forefingers 52 produces the desirable result. In summary, the amount of packing fluid removed using drainers of the invention is up to the discretion of the user.

Drainers of the invention can be used for a variety of meat, vegetable, and fruit food products, and are particularly effective for those that are sponge-like and can be are drained most effectively by the application of some pressure to the product. The invention is particularly useful for draining, for example, but not limited to, canned seafood products such as tuna, salmon, minced clams, and crabmeat. It is also useful for vegetables such as mushrooms, potatoes, artichoke hearts, pimentos, pickles, and olives, and fruits such as pineapple and apple rings. The invention is especially useful with canned products which tend to be spongy and retain significant amount of packing fluid even after draining. For example, some foods retain more than about 50% to as much as about 80% of their free liquid after simply draining in a colander for 1 minute, but can be drained to below this degree, and preferably to about 5–35% simply by using a drainer of the invention. The drainer makes it possible for many people who have impaired ability to squeeze using lids, such as with arthritis, to enjoy tuna and the like without the excess liquid which detracts from the eating experience.

The following examples are presented to further illustrate and explain the present invention and should not be taken as limiting in any regard.

EXAMPLES

The below results were tabulated in a comparison of straining canned tuna and salmon with and without a strainer of the invention. Spread distance was a measurement of how far the liquid squirted from the can.

Example 1

Shop Rite®Chunk Light Tuna Packed in Water—12 oz

Control: Liquid drained (unaided) in colander for 60 seconds—60 grams of liquid was collected.

In this and the following examples, a can of tuna was held about 12 inches above the center of a bowl of about 7 inches in diameter and squeezed by using either the lid (Without Strainer) or with the strainer of the invention. The can was held with the opened top in the vertical orientation. The amount of liquid drained and the time it took were noted. Also, the degree of spread (from the center of the bowl) of the out flowing liquid was measured in those cases where it squirted beyond the bowl.

|         | Spread (inches) | Time (seconds) | Wt of Liquid Drained (grams) |
|---------|-----------------|----------------|------------------------------|
|         | Without Strainer |               |                              |
| Test 1  | 15.5            | 43             | 90                           |
| Test 2  | 9.5             | 33             | 100                          |
| Test 3  | 17.5            | 42             | 70                           |
| Test 4  | 12              | 36             | 65                           |
| Average | 13.6            | 38.5           | 85                           |
|         | With Strainer   |                |                              |
| Test 1  | 0               | 35             | 110                          |
| Test 2  | 0               | 45             | 80                           |
| Test 3  | 0               | 38             | 85                           |
| Test 4  | 0               | 35             | 100                          |
| Average | 0               | 30.3           | 93.8                         |

Conclusions from the above test

Substantial reduction in spread (or, squirt) was achieved by the invention, reducing risk of soiled clothes to users. With the invention, more liquid was removed from the packaged product in less time. The use of the invention was physically easier.

Example 2

Bumble Bee®Tuna Packed in Oil—6 oz

Control: Liquid drained (unaided) in colander for 60 seconds—60 grams of liquid was collected.

|         | Spread (inches) | Time (seconds) | Wt of Liquid Drained (grams) |
|---------|-----------------|----------------|------------------------------|
|         | Without Strainer |               |                              |
| Test 1  | 16.5            | 40             | 70                           |
| Test 2  | 8               | 38             | 60                           |
| Test 3  | Lid collapse    | —              | —                            |
| Test 4  | 4               | 35             | 70                           |
| Average | 9.5             | 37.7           | 66.7                         |
|         | With Strainer   |                |                              |
| Test 1  | 0               | 33             | 80                           |
| Test 2  | 0               | 38             | 65                           |
| Test 3  | 0               | 38             | 70                           |

-continued

| | Spread (inches) | Time (seconds) | Wt of Liquid Drained (grams) |
|---|---|---|---|
| Test 4 | 0 | 33 | 75 |
| Average | 0 | 35.5 | 72.5 |

Conclusions from Example 2

Without the invention, there was significantly greater spread to put the users clothes at risk. One test without the invention caused the lid to collapse, causing a wide disbursement of tuna around the test area. This is indicative of the need for force when the lid is used. Without the invention, more tuna was squeezed though the edges of the can, causing loss of product. With the invention, no spread was noted more liquid was removed on average in less time.

Example 3

Shop Rite®Chopped Deep Sea Clams Packed in Water—6.5 oz

Control: Liquid drained (unaided) in colander for 60 seconds—130 grams of liquid was collected.

| | Spread (inches) | Time (seconds) | Wt of Liquid Drained (grams) |
|---|---|---|---|
| | Without Strainer | | |
| Test 1 | 4 | 12 | 125 |
| Test 2 | 0 | 14 | 130 |
| Test 3 | 2 | 16 | 135 |
| Average | 2 | 14 | 85 |
| | With Strainer | | |
| Test 1 | 0 | 20 | 135 |
| Test 2 | 0 | 18 | 140 |
| Test 3 | 1 | 14 | 125 |
| Average | .33 | 30.3 | 148.3 |

Conclusions from Example 3

More liquid was drained with the strainer than with the lid, although it took longer. Because of the nature of the product (looser, individual particles) and the liquid (water or brine), the strainer was not as noticeable a benefit to the user, although the invention was easier to use especially on the first test (note spread distance on test 1 with lid).

The above description is for the purpose of illustrating and not limiting the present invention, and teaching the person of ordinary skill in the art how to practice it. The description is not intended to detail all those obvious modifications and variations of it which will become apparent to the skilled worker upon reading the description. It is intended, however, that all such obvious modifications and variations be included within the scope of the present invention as defined in the appended claims.

I claim:

1. A food can drainer installed within a can that has a top and a bottom and contains a solid, spongy foodstuff and packing fluid, comprising a foraminous, substantially planar structure having outside dimensions sized to fit the interior of the can top and having holes spaced over substantially the entire planar surface and being fabricated so that, when the drainer is installed within the top of the can, packing fluid can be pressed therefrom, said drainer being fabricated to withstand manual pressure exerted between the drainer positioned within the top of the can and the can bottom, to enhance flow of the packing fluid.

2. A drainer according to claim 1 comprising a perforated disc.

3. A drainer according to claim 2 comprising a plastic disc.

4. A drainer according to claim 3 wherein the holes in the perforated disc are positioned and sized to enhance decanted packing fluid flow to the middle of the disc, and away from the sides.

5. A drainer according to claim 1 installed in the can after canning.

6. A canned tuna or salmon fish drainer according to claim 1.

7. A method for pressing fluid from a spongy food product contained in a can having a top and a bottom and containing fluid, comprising placing within a can prior to closing a foraminous, substantially planar drainer sized to fit within the interior of the can top and having holes arranged over substantially the entire drainer and fabricated so that, when the drainer is installed at the top of the can, packing fluid can be pressed therefrom, said drainer being fabricated to also withstand manual pressure exerted between the top of the can and its bottom, to enhance flow of the decanted packing fluid when the drainer is pressed against the can bottom.

8. A method according to claim 7 wherein the drainer is installed after canning.

9. A method according to claim 7 for controlling the flow decanted from tuna fish or salmon cans.

\* \* \* \* \*